United States Patent
Hooper et al.

(10) Patent No.: US 10,232,761 B2
(45) Date of Patent: Mar. 19, 2019

(54) UNMANNED UNDERWATER VEHICLE TRANSPORT CART

(71) Applicant: The United States of America, San Diego, CA (US)

(72) Inventors: Ralph David Hooper, Lemon Grove, CA (US); William A. Chambers, Jamul, CA (US); Jeffery Towns Gilchrist, Cardiff, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/861,480

(22) Filed: Jan. 3, 2018

(65) Prior Publication Data
US 2018/0265113 A1    Sep. 20, 2018

Related U.S. Application Data

(60) Provisional application No. 62/471,730, filed on Mar. 15, 2017.

(51) Int. Cl.
*B62B 3/02* (2006.01)
*B60P 3/10* (2006.01)
(Continued)

(52) U.S. Cl.
CPC .............. *B60P 3/1075* (2013.01); *B60P 3/10* (2013.01); *B62B 3/02* (2013.01); *B62B 3/04* (2013.01);
(Continued)

(58) Field of Classification Search
CPC . B60P 3/10; B60P 3/1075; B62B 3/02; B62B 3/04; B62B 3/102; B62B 3/104;
(Continued)

(56) References Cited

U.S. PATENT DOCUMENTS 2,603,369 A * 7/1952 Soderstrom ........... B62B 3/0618
254/2 R
2,693,253 A * 11/1954 Meyer ...................... B62B 5/04
188/116
(Continued)

FOREIGN PATENT DOCUMENTS

| GB | 501302 A | * | 2/1939 | ............... B64D 1/22 |
| GB | 672562 A | * | 5/1952 | ............... B62B 5/06 |
| GB | 1605378 A | * | 7/1994 | ............... B63G 3/02 |

OTHER PUBLICATIONS

HMS London; Photo of Torpedo Cart; available online at https://www.hazegray.org/features/nato/uk/london/london3.ipg (accessed Nov. 28, 2017).

(Continued)

*Primary Examiner* — James A Shriver, II
*Assistant Examiner* — Steve Clemmons
(74) *Attorney, Agent, or Firm* — SPAWAR Systems Center Pacific; Kyle Eppele; J. Eric Anderson

(57) ABSTRACT

An unmanned underwater vehicle (UUV) transport cart comprising: a wheeled frame including vertical posts, a front end, and a rear end; a UUV cradle adjustably clamped to the vertical posts such that the UUV cradle is vertically adjustable with respect to the frame; a U-shaped handle pivotally attached to the front end of the frame such that the U-shaped handle pivots up and down around a first axis, wherein the U-shaped handle includes a handle spring that acts between the U-shaped handle and the frame so as to bias the U-shaped handle toward an upward orientation; side handles pivotally attached to the UUV cradle such that the side handles pivot up and down around side axes that are perpendicular to the first axis; and a hand brake affixed to the U-shaped handle and configured to provide active brake control of the wheeled frame.

16 Claims, 3 Drawing Sheets

(51) Int. Cl.
*B66C 1/36* (2006.01)
*B63B 21/54* (2006.01)
*F16B 45/02* (2006.01)
*B62B 3/04* (2006.01)
*B62B 5/04* (2006.01)
*B62B 5/06* (2006.01)
*B63B 21/60* (2006.01)
*A44B 13/02* (2006.01)
*B63G 8/00* (2006.01)
*B63B 27/16* (2006.01)

(52) U.S. Cl.
CPC ............ *B62B 5/0438* (2013.01); *B62B 5/067* (2013.01); *B63B 21/54* (2013.01); *B63B 21/60* (2013.01); *B66C 1/36* (2013.01); *F16B 45/02* (2013.01); *F16B 45/025* (2013.01); *A44B 13/02* (2013.01); *B62B 2005/0471* (2013.01); *B62B 2202/90* (2013.01); *B62B 2301/04* (2013.01); *B63B 2027/165* (2013.01); *B63G 2008/002* (2013.01)

(58) Field of Classification Search
CPC ......... B62B 5/0438; B62B 5/067; B62B 5/06; B62B 2202/90; B62B 2202/403; B62B 2202/41; B62B 2202/022; B62B 2206/06; F41A 9/87
See application file for complete search history.

(56) References Cited

U.S. PATENT DOCUMENTS

| | | | | | |
|---|---|---|---|---|---|
| 2,851,235 | A | * | 9/1958 | Henig | F41A 9/87 280/79.6 |
| 2,898,067 | A | * | 8/1959 | Hiser | A47F 7/30 248/176.3 |
| 3,024,925 | A | | 3/1962 | Werner et al. | |
| 3,038,614 | A | * | 6/1962 | Morley | F41A 9/87 414/495 |
| 3,170,582 | A | * | 2/1965 | Gilbert | F41A 9/87 292/139 |
| 4,302,023 | A | * | 11/1981 | Kiesz | B62B 3/02 108/106 |
| 5,016,893 | A | * | 5/1991 | Hart, Jr. | B62B 3/10 211/195 |
| 5,123,665 | A | * | 6/1992 | Levy | B62B 3/022 211/201 |
| 5,195,767 | A | * | 3/1993 | Des Roches | B60P 3/1075 280/414.1 |
| 6,171,048 | B1 | * | 1/2001 | Grimes | B62B 3/02 414/427 |
| 6,206,385 | B1 | * | 3/2001 | Kern | B62B 3/02 280/47.35 |
| 7,150,465 | B2 | * | 12/2006 | Darling, III | A61G 1/013 280/640 |
| 7,712,429 | B1 | * | 5/2010 | Gibson | B60P 3/1058 114/259 |
| 8,118,293 | B1 | * | 2/2012 | Barger | B23Q 7/05 144/287 |
| 8,893,604 | B1 | * | 11/2014 | Gray | F41H 11/14 280/400 |
| 2005/0167935 | A1 | * | 8/2005 | Weeks | B62B 1/26 280/47.331 |
| 2011/0173778 | A1 | * | 7/2011 | Wales | B25G 3/20 16/426 |
| 2017/0008543 | A1 | * | 1/2017 | Elliott | B62B 1/004 |
| 2017/0356593 | A1 | * | 12/2017 | Churchvara | B62B 3/04 |
| 2018/0147970 | A1 | * | 5/2018 | Lasley | B60P 3/10 |

OTHER PUBLICATIONS

RJ Cox; Photo of Platform Trolley with Deadman Brake System; available online at https://www.rjcox.com.au/product/2203/99118/jumbo-370kg-platform-trolley-with-deadman-brake-system/ (accessed Nov. 28, 2017).

* cited by examiner

UNMANNED UNDERWATER VEHICLE TRANSPORT CART

CROSS-REFERENCE TO RELATED APPLICATION

This application claims benefit of the provisional U.S. patent application 62/471,730, filed 15 Mar. 2017, titled "Unmanned Underwater Vehicle Transport and Recovery Devices" (Navy Case #104026).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 104026.

BACKGROUND OF THE INVENTION

Transportation of unmanned, underwater vehicles (UUVs) to a floating dock or pier may require movement over a deck-ramp between shore and pier. UUVs can weigh over 362 kg (800 lbs.) and measure over 4 meters long. Existing carts for transporting UUVs are difficult to maneuver safely by hand. Avoiding an unsafe condition on the ramp and presenting the UUV for a side-by-side loading to a small boat is a continuing need. The cart detailed herein offers greater safety and a wider range of utility when pier-side height variances are encountered.

SUMMARY

Described herein is a UUV transport cart and a method for using the same. The UUV transport cart comprises a wheeled frame, a UUV cradle, a U-shaped handle, side handles, and a hand brake. The wheeled frame includes vertical posts, a front end, and a rear end. The UUV cradle is adjustably clamped to the vertical posts such that the UUV cradle is vertically adjustable with respect to the frame. The U-shaped handle is pivotally attached to the front end of the frame such that the U-shaped handle pivots up and down around a first axis. In addition, the U-shaped handle includes a handle spring that acts between the U-shaped handle and the frame so as to bias the U-shaped handle toward an upward orientation. The side handles are pivotally attached to the UUV cradle such that the side handles pivot up and down around side axes that are perpendicular to the first axis. The hand brake is affixed to the U-shaped handle and configured to provide active brake control of the wheeled frame.

The method for using the UUV transport cart for transporting a UUV comprises the following steps. One step provides for adjusting the height of a cradle of a UUV transport cart to a desired height. Another step provides for placing the UUV on the cradle. Another step provides for having a first user move the UUV transport cart over a deck by manipulating a U-shaped, spring-returned handle that is mounted to a wheeled frame of the UUV transport cart. Another step provides for having the first user actively brake the UUV transport cart as needed as it travels over the deck by employing a handbrake mounted to the U-shaped, spring-returned handle. Another step provides for having a second user assist the first user in moving the UUV transport cart over the deck by manipulating a first side handle pivotally attached to a mid-section of the cradle.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
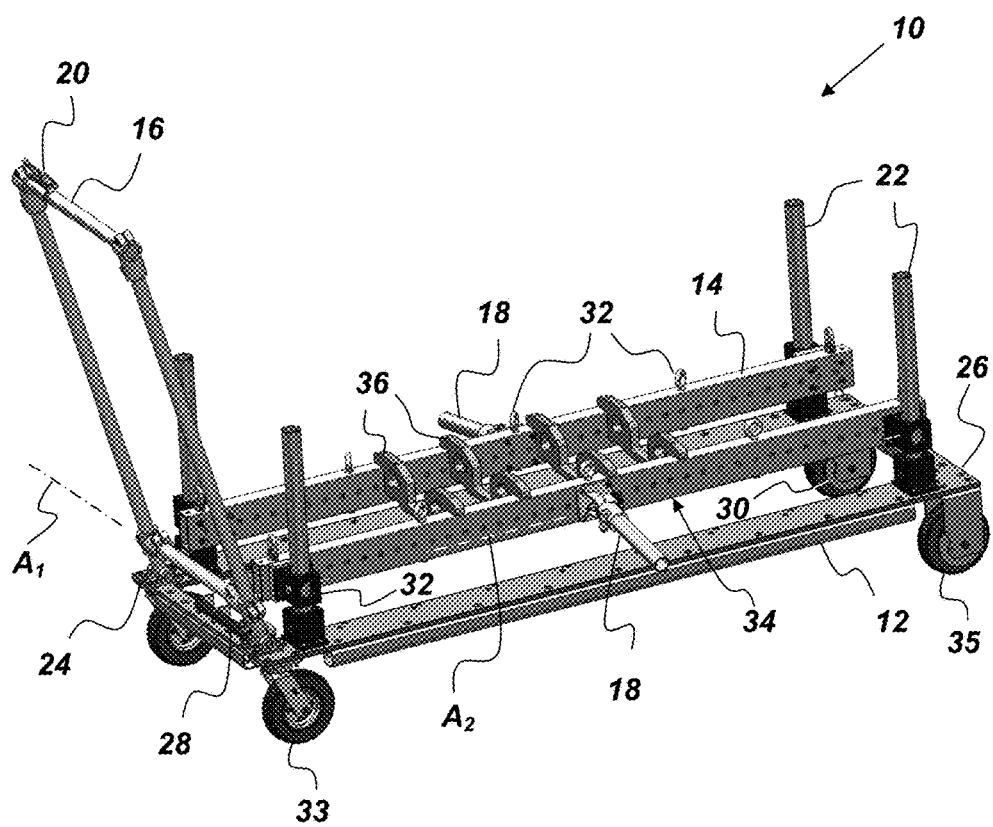
FIG. 1 is a perspective view of a UUV transport cart.

FIG. 1 is a perspective view of a UUV transport cart 10 that comprises, consists of, or consists essentially of a wheeled frame 12, a UUV cradle 14, a U-shaped handle 16, side handles 18, and a hand brake 20. The wheeled frame 12 includes vertical posts 22, a front end 24, and a rear end 26. The UUV cradle 14 is adjustably clamped to the vertical posts 22 such that the UUV cradle 14 is vertically adjustable with respect to, and removable from, the frame 12. The U-shaped handle 16 is pivotally attached to the front end 24 of the frame 12 such that the U-shaped handle 16 pivots up and down around a first axis $A_1$. In addition, the U-shaped handle 16 includes a handle spring 28 that acts between the U-shaped handle 16 and the frame 12 so as to bias the U-shaped handle 16 toward an upward orientation (such as is shown in FIG. 1). In other words, the handle spring 28 has a spring force sufficient to raise the U-shaped handle 16 to the upward orientation when not in use. The side handles 18 are pivotally attached to the UUV cradle 14 such that the side handles 18 pivot up and down around side axes $A_2$ that are perpendicular to the first axis $A_1$. The hand brake 20 is affixed to the U-shaped handle 16 and configured to provide active brake control of the wheeled frame 12.

Figure 2A:
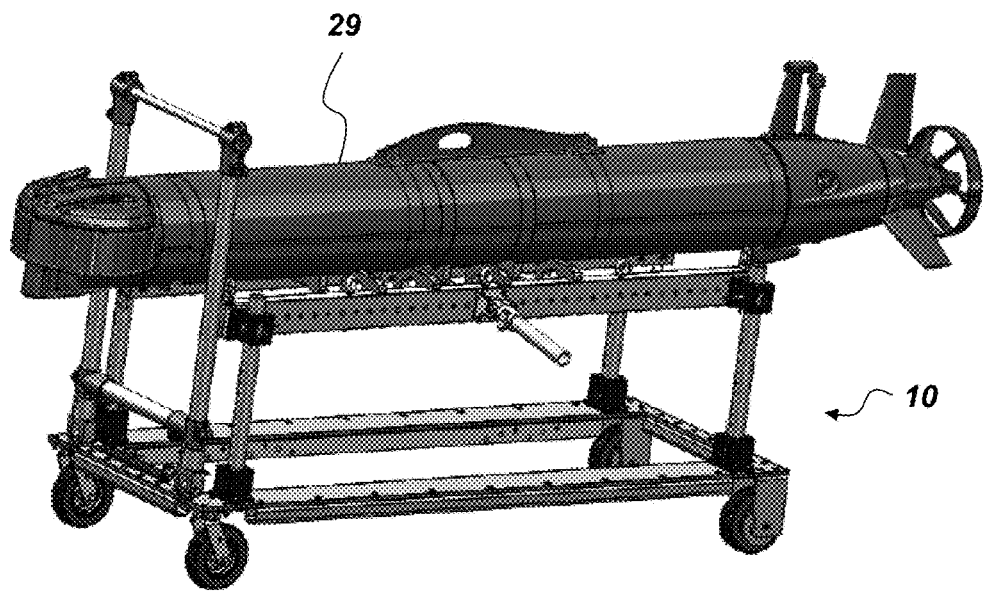
FIGS. 2A and 2B are respectively perspective and top views of a UUV transport cart holding a UUV.
Figure 2B:
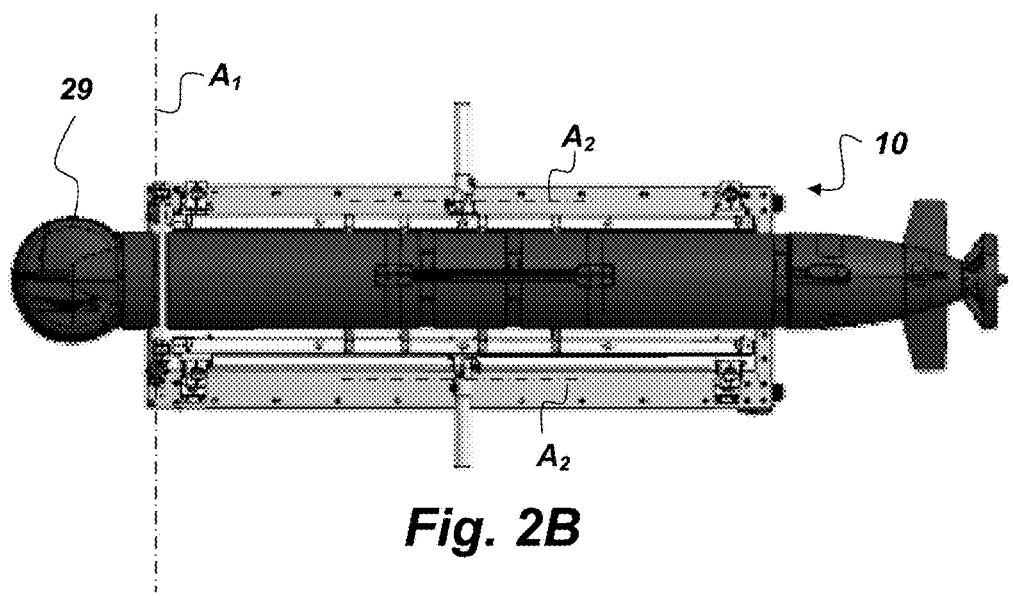

FIGS. 2A and 2B are respectively perspective and top views of the UUV transport cart 10 supporting a UUV 29. The UUV transport cart 10 provides a rolling cart with sufficient weight capacity, braking capability, and height-adjustment to safely handle a UUV by hand on a ship's deck or on land. The UUV transport cart 10 facilitates loading/unloading of UUVs from small boats while the boat is adjacent to a pier. The small boats typically have a lifting arm and a winch. As a result of tidal variance, arriving at a pier with a large height difference between the pier's deck and the lift arm creates difficulty with the loading/unloading operation. The UUV transport cart 10 solves that difficulty. Custom disc brakes 30 (see FIG. 1) provide active braking through the hand brake 20 on the U-shaped handle 16. In the embodiment of the UUV transport cart 10 depicted in FIGS. 1, 2A & 2B, two swiveling caster wheels 33 are mounted to the front end 24 and the disc brakes 30 are mounted to at least one of two rigid caster wheels 35 on the rear end 26 of the wheeled frame 12. Active brake control can be important when transporting a UUV that may weigh 454 kilograms (1000 lbs) on a ship's deck.

The UUV cradle 14 may optionally comprise tie-down points 32 to allow a UUV to be secured to the UUV cradle 14. The bottom side 34 of the UUV cradle 14 is shaped so as to allow the UUV cradle 14 to rest flat on a surface when detached from the frame 12. The UUV cradle 14 further comprises at least two UUV bunk supports 36 disposed within the UUV cradle 14 and configured to support the UUV. With the side handles pivoted sufficiently up or down the size of the UUV transport cart 10 is such that the UUV transport cart 10 may fit through a human doorway. A suitable material for the wheeled frame 12 is, but is not limited to, angle iron.

The vertical posts 22, in combination with a clamping/locking system 32, form a vertical rail system that allows the height of the UUV cradle 14 to be adjusted as required. The vertical rail system is capable of holding the UUV cradle 14 and any UUV resting thereon in place once adjusted. If a UUV has been secured to the cradle 14 and the UUV is then attached to a lifting cable the clamping/locking system 32 may be released to allow the lifting cable to simultaneously lift the UUV and the cradle 14 off of the frame 12. The UUV and cradle 14 may then be placed on a relatively flat surface. Furthermore, if the user requires minimal height of the UUV on the cart, the vertical posts 22 may be removed and the bunks can be mounted to the frame 12 to reach minimal heights. The side handles 18 allow more than one person to successfully assist in transiting the UUV transport cart 10 with a UUV loaded thereon.

Figure 3:
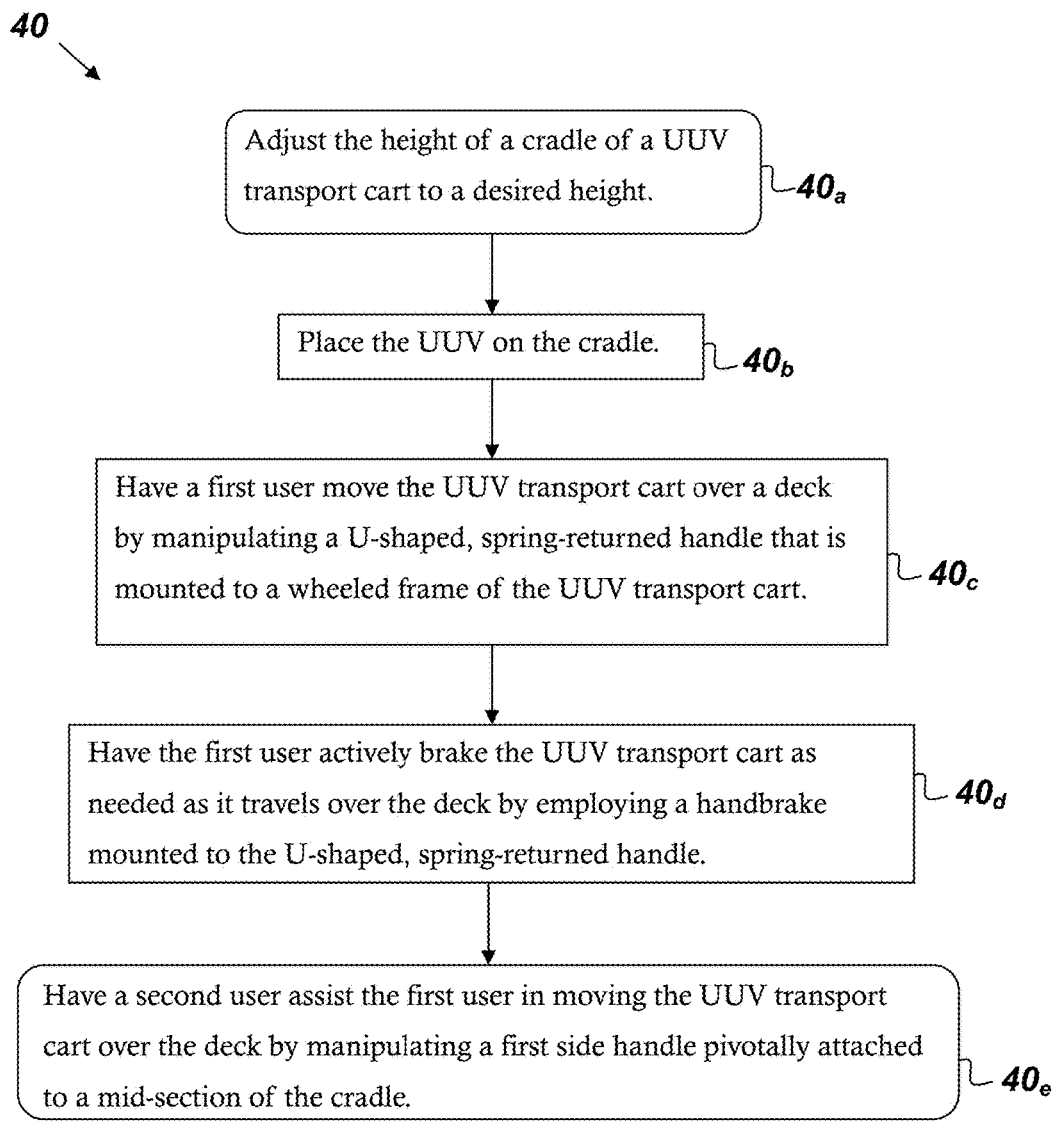
FIG. 3 is a flowchart of a method for using a UUV transport cart to move a UUV.

FIG. 3 is a flowchart of a method 40 for transporting a UUV with a UUV transport cart comprising the following steps. One of the steps $40_a$ comprises adjusting the height of a cradle of a UUV transport cart to a desired height. Another step $40_b$ provides for placing the UUV on the cradle. Another step $40_c$ provides for having a first user move the UUV transport cart over a deck by manipulating a U-shaped, spring-returned handle that is mounted to a wheeled frame of the UUV transport cart. Another step $40_d$ provides for having the first user actively brake the UUV transport cart as needed as it travels over the deck by employing a handbrake mounted to the U-shaped, spring-returned handle. Another step $40_e$ provides for having a second user assist the first user in moving the UUV transport cart over the deck by manipulating a first side handle pivotally attached to a mid-section of the cradle. Optionally, a third user may assist the first and second users in moving the UUV transport cart over the deck by manipulating a second side handle pivotally attached to the cradle on an opposite side of the cradle from the first side handle. The UUV transport method 40 may be used, for example, to transport the UUV from a ship to a maintenance shop.

From the above description of the UUV transport cart 10 and the method of using the same to transport a UUV, it is manifest that various techniques may be used for implementing the concepts of the UUV transport cart 10 and method 40 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the UUV transport cart 10 and method 40 are not limited to the particular embodiments described herein, but are capable of many embodiments without departing from the scope of the claims.

We claim:

1. An unmanned underwater vehicle (UUV) transport cart comprising:
    a wheeled frame including vertical posts, a front end, and a rear end;
    a UUV cradle adjustably clamped to the vertical posts such that the UUV cradle is vertically adjustable with respect to the frame;
    a U-shaped handle pivotally attached to the front end of the frame such that the U-shaped handle pivots up and down around a first axis, wherein the U-shaped handle includes a handle spring that acts between the U-shaped handle and the frame so as to bias the U-shaped handle toward an upward orientation;
    side handles pivotally attached to the UUV cradle such that the side handles pivot up and down around side axes that are perpendicular to the first axis; and
    a hand brake affixed to the U-shaped handle and configured to provide active brake control of the wheeled frame.

2. The UUV transport cart of claim 1, wherein the UUV cradle further comprises tie-down points to allow a UUV to be secured to the UUV cradle.

3. The UUV transport cart of claim 2, wherein a bottom side of the UUV cradle is shaped so as to allow the UUV cradle to rest flat on a surface when detached from the frame.

4. The UUV transport cart of claim 3, wherein the cradle further comprises at least two UUV bunk supports disposed within the cradle and configured to hold the UUV.

5. The UUV transport cart of claim 1, wherein the wheeled frame comprises swiveling caster wheels on the front end and rigid caster wheels on the rear end.

6. The UUV transport cart of claim 5, wherein the hand brake actively controls disk brakes mounted to one of the rigid caster wheels.

7. The UUV transport cart of claim 1, wherein the frame is sized and the side handles pivot so as to allow the UUV transport cart to fit through a human doorway.

8. The UUV transport cart of claim 1, wherein in a lowest height setting, the vertical posts are removed from the frame and the cradle is mounted directly to the frame.

9. The UUV transport cart of claim 1, wherein the frame is constructed of angle iron.

10. The UUV transport cart of claim 1, wherein the frame and cradle are designed to support a UUV weighing up to 454 kilograms (1000 lbs).

11. The UUV transport cart of claim 1, wherein the side handles are pivotally mounted to opposite sides of the cradle.

12. The UUV transport cart of claim 11, wherein the side handles are pivotally mounted to the sides of the cradle midway between the front and rear ends of the frame.

13. The UUV transport cart of claim 1, wherein the handle spring has a spring force sufficient to raise the handle to the upward orientation when not in use.

14. A method for transporting an unmanned underwater vehicle (UUV), comprising:
    adjusting the height of a cradle of a UUV transport cart to a desired height;
    placing the UUV on the cradle;
    having a first user move the UUV transport cart over a deck by manipulating a U-shaped, spring-returned handle that is mounted to a wheeled frame of the UUV transport cart;

having the first user actively brake the UUV transport cart as needed as it travels over the deck by employing a handbrake mounted to the U-shaped, spring-returned handle; and having a second user assist the first user in moving the UUV transport cart over the deck by manipulating a first side handle pivotally attached to a mid-section of the cradle.

15. The UUV transport method of claim 14, further comprising the step of having a third user assist the first and second users in moving the UUV transport cart over the deck by manipulating a second side handle pivotally attached to the cradle on an opposite side of the cradle from the first side handle.

16. The UUV transport method of claim 15, wherein the UUV transport cart is used to transport the UUV from a ship to a maintenance shop.

\* \* \* \* \*